(12) United States Patent
Den Breejen et al.

(10) Patent No.: US 8,203,574 B2
(45) Date of Patent: Jun. 19, 2012

(54) DYNAMIC SOFTCLIPPING OF VIDEO LEVELS

(75) Inventors: Jeroen Den Breejen, Eindhoven (NL); Hendrikus Willem Groot Hulze, Eindhoven (NL)

(73) Assignee: NXP B.V., Eindhoven (NL)

( * ) Notice: Subject to any disclaimer, the term of this patent is extended or adjusted under 35 U.S.C. 154(b) by 1115 days.

(21) Appl. No.: 12/088,727

(22) PCT Filed: Sep. 21, 2006

(86) PCT No.: PCT/IB2006/053412
§ 371 (c)(1),
(2), (4) Date: Mar. 31, 2008

(87) PCT Pub. No.: WO2007/036851
PCT Pub. Date: Apr. 5, 2007

(65) Prior Publication Data
US 2008/0259217 A1    Oct. 23, 2008

(30) Foreign Application Priority Data

Sep. 30, 2005  (EP) .................................. 05109090

(51) Int. Cl.
*G09G 5/02* (2006.01)
(52) U.S. Cl. ........................ 345/617; 345/589
(58) Field of Classification Search .................. 345/617, 345/589
See application file for complete search history.

(56) References Cited

U.S. PATENT DOCUMENTS

| | | | | |
|---|---|---|---|---|
| 4,862,270 A | * | 8/1989 | Nishio | 348/721 |
| 5,339,114 A | * | 8/1994 | Lagoni et al. | 348/673 |
| 5,422,680 A | * | 6/1995 | Lagoni et al. | 348/674 |
| 5,517,333 A | * | 5/1996 | Tamura et al. | 358/518 |
| 6,285,413 B1 | * | 9/2001 | Akbayir | 348/678 |
| 6,567,124 B1 | * | 5/2003 | Tran | 348/255 |
| 2001/0028691 A1 | | 10/2001 | Posch | |
| 2002/0015436 A1 | | 2/2002 | Ovard et al. | |

FOREIGN PATENT DOCUMENTS

| | | |
|---|---|---|
| EP | 0963111 A1 | 12/1999 |
| JP | 2000307896 A | 11/2000 |
| JP | 2003259154 A | 9/2003 |
| WO | WO 2007036851 A2 * | 4/2007 |

* cited by examiner

*Primary Examiner* — Javid A Amini (57) ABSTRACT

A method for improvement of contrast in an image shown on a display having a range of displayable video levels. The method comprises providing input video levels representing the image, said levels being within said displayable range; providing a transfer function (120, 121) having a slope greater than one everywhere in a gain region (130) of said displayable range, and a slope greater than zero and less than one everywhere in a softclip region (131) of said displayable range, said regions (130, 131) meeting at a threshold level (125), the transfer function (120, 121) being adapted to transfer any input video level within said displayable range to an output level within displayable said range; and transforming said input levels into output levels within said range, using the transfer function (120, 121). According to the invention, instead of "hardclipping" there is a "softclipping" of levels. Hence, compared to conventional methods, a higher gain may be used. In practical situations, the gain applied in the gain region typically may be up to 4.

17 Claims, 4 Drawing Sheets

Prior art

DYNAMIC SOFTCLIPPING OF VIDEO LEVELS

TECHNICAL FIELD

The present invention relates to a method for improvement of contrast in an image shown on a display using a gain.

TECHNICAL BACKGROUND

One way of increasing contrast in an image shown on a display, for example a LCD or plasma display, is to apply a gain (>1) to the image data. For example, this may be desired in images where the pixels have nearly the same luminance value, e.g. in pictures with a lot of dark regions. The gain results in higher video levels, i.e. typically a brighter image, and a greater spread amongst the video levels, i.e. an increase of perceived contrast.

Another situation where it may be desired to apply a gain, is when a Dynamic Backlight Algorithm (DBL) is used in an LCD. In LCD's, dark scenes tend to look "bluish" due to leakage of backlight through the LCD panel and a solution to this is to decrease the backlight luminance at such scenes by use of a DBL. When the backlight luminance is reduced, a video gain is required as compensation to accomplish a similar impression of brightness and similar, or even improved perceived contrast as before the reduction of backlight luminance.

Further, the displayable range of video levels typically is limited to a fixed number of different colors, within fixed ranges. For example, each one of the three components in a RGB-representation of a pixel in an image, may be restricted to 8-bits, providing 256 possible video levels (represented by integer values 0-255) for each component (R, G or B).

Corresponding limitations of course also apply in other types of video level representation, or color gamuts, e.g. luminance (Y) in a CMY-representation.

Typically, low values represent darker colors, and high values represent lighter colors, e.g. 0 represents the darkest color, and 255 represents the lightest color.

When a gain applied to the image data results in that the video level of a pixel is out of the displayable range, e.g. exceeds a maximum value such as 255, a known method is to "hardclip" such values, i.e. pixels that, according to the gain, would get a value exceeding the maximum value will instead end up being equal to the maximum value (e.g. 255). A consequence from this is loss of local details; substantial parts of the image may be shown as 'flat' regions of highly saturated color (all pixels in the region having the maximum value) and certain details in the original image may be lost.

Thus, by applying a gain to increase the value for some pixels in a region of an image, there is a risk for loss in contrast at other regions due to hardclipping. This often becomes a limiting factor with respect to how much gain that can be applied in practice.

EP0963111A1 discloses a method and apparatus for dynamic contrast improvement in images by use of a dual segment transfer function.

Figure 1:
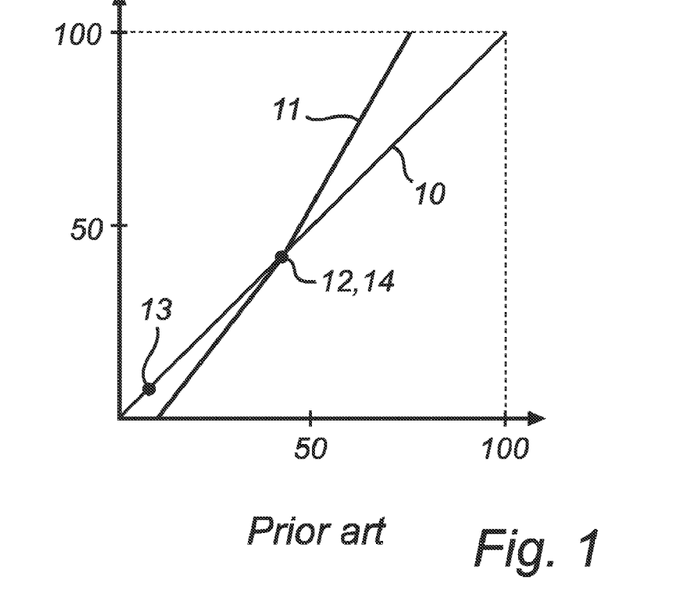
FIG. 1 shows a transfer function from the prior art.

FIG. 1 shows an input to output diagram as disclosed in EP0963111A1, comprising a transfer function for luminance values in units of IRE (Institute of Radio Engineers). When there is no contrast improvement, there is no gain (a 1:1 relation input to output) and the transfer function is simply a "unity gain"-function 10, i.e. a line with slope 1 that intersects the origin of coordinates. The "dual segment" referred to in EP0963111A1, relates to a transfer function 11, represented by the line 11 in FIG. 1, consisting of two segments, a first segment with slope >=1, preferably 1.5, that at an adaptive pivot point 12 changes into a second segment with slope>=1, preferably 1.7. The adaptive pivot point is always located along the unity gain line 12. In FIG. 1, the adaptive pivot point is shown at its upper end position 14 (40,40). The lower end position (7,7), is represented by point 13.

In the method of EP0963111A1, the video frames, or fields, are analyzed in real time. In the first segment, the segment gain (the slope) is adaptive to the dark sample distribution—a higher value is selected if there are fewer dark samples, and a lower value if there is a high number of dark samples.

In the second segment, the segment gain (the slope) is adaptive to the detected peak value, and the "unity gain"-function is selected if the detected peak value is equal to, or higher than, the nominal peak value, else the "second gain" transfer function is used.

However, although the method of EP0963111A1 can be used to improve contrast in both darker and light regions, it can only provide a relatively small gain, thus small improvement of contrast, especially in case of pictures with high numbers of dark samples, e.g. in scenes where dark pixels dominate. This, for example, makes it unsuitable for use in connection with dynamic backlight in LCDs.

Further, although the method of EP0963111A1 can be used to prevent hardclipping in light regions by use of "unity gain" in the second segment, any gain applied in the first segment may result in a need to hardclip in dark regions, i.e., since the transfer function can produce values below 0 (black), the output may need to "clip" these values to black, and hence contrast in dark regions will be lost.

SUMMARY OF THE INVENTION

It is an object of the present invention to overcome problems in the prior art. A specific object is to provide a method that admits a relatively high gain of video levels with a relatively high quality of the processed images.

This and other objects are achieved by a method and a signal processing device for improvement of contrast in an image shown on a display having a range of displayable video levels. The method comprises the steps of providing input video levels representing the image, the levels being within the displayable range; providing a transfer function having a slope greater than one everywhere in a gain region of the displayable range, and a slope greater than zero and less than one everywhere in a softclip region of the displayable range, the transfer function being adapted to transfer any input video level in said range to a level within said range, the regions meeting at a threshold level; and transforming the input levels into output levels within said range, using the transfer function.

A "slope" of a function at a certain input value of the function, corresponds to the derivative of the function at that input value. For example, the derivative of a linear function is a constant, and thus has a constant slope, i.e. a slope independent of the input values. A non-linear function, on the other hand, has a slope that changes and is different at different input values.

The invention is based on the understanding that by using a gain factor, i.e. a slope of a transfer function, that is greater than 1, in a gain region, and a compression, i.e. a slope between 0 and 1, in a softclip region, it is possible to apply a high gain to levels in the gain region, e.g. low levels, or dark regions, in an image, without the need of hardclipping any levels that are outside of the gain region. At the same time the input levels that are being transformed can be kept within the range of displayable levels.

According to conventional methods, a higher gain, i.e. a large slope, typically means that more output levels will end up outside the range of displayable levels, and thus a larger amount of levels will have to be hardclipped. According to the present invention the gain in the softclip region ensures that such levels are compressed into a range of levels, all within the displayable range, thereby having a milder impact on the resulting image. In other words, instead of "hardclipping" there is a "softclipping" of levels. Hence, compared to conventional methods, a higher gain may be used. In practical situations, the gain applied in the gain region typically may be up to 4.

The transfer function may be defined by a linear gain function having a slope greater than 1, and a linear softclip function having a slope between 0 and 1, both functions being defined in both regions (i.e. the entire displayable range), so that an intersection of these linear functions defines the threshold level.

In other words, the transfer function will be equal to the linear gain function in the gain region and equal to the linear softclip function in the softclip region. By combining two functions, i.e. the gain function and the softclip function, in this way, and letting each define different parts of the transfer function, each function can be very simple, which allows for implementations requiring only a small amount of resources. Each function may be implemented separately, for example, one option may be to take advantage of an already existing gain function implementation, like a gain factor multiplier. The softclip function may be implemented using a look-up-table, and one or a number of softclip functions may be predefined and stored in the look-up table.

Also, although each function alone may not be able to transfer all of the levels in the range to a level within same range, i.e. to another displayable level, the two functions in combination provide a full displayable coverage of the range, without any hardclipping.

It should be noted that other continuous functions instead of linear functions could be used and combined in a similar manner. In such case each of these functions also should be defined in both regions, i.e. the functions should overlap each other, and present slopes that are within the limits set for the respective region.

The slope of the gain transfer function may be adjusted based on the input video levels.

The adjustment of the slope typically is made to ensure that a desired gain is applied and/or to avoid that a too large amount of levels are softclipped. A larger slope, i.e. a higher gain, corresponds to a smaller gain region and hence a larger amount of levels that will require softclipping. Therefore, adjusting the slope of the gain transfer function may not only concern applying a desired gain, but also to make sure that not too many levels are being softclipped, i.e. to make sure that the gain provides a reasonable image quality. For example, when a maximal gain is desired, which may be the case in combination with dynamic backlighting, the slope can be adjusted based on information on the amount of levels in the softclip region. It should be noted that if a static softclip transfer function is used and only the gain transfer function is adjusted, the result still may be a dynamic behavior in both regions, since the point of intersection and thus the two regions may change.

The slope of the gain transfer function may also be adjusted based on the output video levels.

For example, the gain may be adjusted based on a count of the amount of video levels that are softclipped. An "amount of video levels" may be relative to the total amount of video levels in the image, i.e. may be represented by a percentage value. Also, since any image, explicitly or implicitly, has a certain resolution, i.e. a limited amount of pixels, and since video levels, explicitly or implicitly, pertains to individual pixels, an image has an amount of video levels that is proportional to the number of image pixels. Thus the amount of video levels may correspond to a number of pixels, or to a percentage of all pixels of the image.

Using a feedback that provides information on the amount of input levels, or pixels, that actually are being softclipped, enables auto-adjustment of the gain transfer function.

For example, the slope of the gain transfer function may be increased until the amount of softclipped levels reaches a certain threshold. Further, no extensive analyzing of video levels prior to using the gain function may be required, instead it may suffice to select a starting value for the gain and then let it adjust based on the output being produced.

Also the slope of the softclip transfer function may be adjusted based on the input video levels and/or output video levels.

By adjusting the slope of the softclip function, the amount of levels that are being softclipped may be affected, without tampering with or changing the gain, i.e. the slope of the gain transfer function. The degree of softclipping, i.e. compression, also is changed by this.

A slope approaching 1 means approaching "unity gain" and almost no compression at all, while a slope approaching 0 means approaching "hardclipping" and hard compression. Also, it should be noted that, similar to the above, when only the softclip function is adjusted and the gain function is static, the result still may be a dynamic behavior in both regions, since the point of intersection and thus the two regions may change.

Using a feedback that provides information on the amount of output levels, e.g. represented by a number of pixels, that actually are being softclipped, enables auto-adjustment of the softclip transfer function. For example, the slope of the softclip transfer function may be increased until the amount of softclipped levels reaches a certain threshold. Further, by using a feedback, no extensive analyzing of video levels may be required prior to using the softclip function, instead it may suffice to select a reasonable starting value for the slope and then let it auto-adjust based on the output being produced.

The step of transforming the input video levels may involve determining output video levels from both transfer functions in both regions.

By using both functions for all input values, i.e. transforming levels using the gain function also in the softclip region and vice versa, values can be produced without any concern of which region a certain input level belongs to. This means that the softclip function and the gain function can be used in parallel paths and be virtually independent from each other. Thus, implementing the method in hardware or software can be made in a convenient and simple manner.

The output video levels may be formed by selecting, for each input video level, the lowest output level from the transfer functions.

When the gain region is for low levels and the softclip region is for high levels, selecting the lowest value results in that the values produced by the gain function are selected in the gain region, and levels produced by the softclip function are selected in the softclip region. This is a very convenient way of picking correct values from the respective function, since it is just a matter of comparing and selecting, which may be implemented by for example a comparator and multiplexer. It should be noted, that when the gain region is for high levels and the softclip region is for low levels, a similar effect may be achieved by instead selecting the highest value.

BRIEF DESCRIPTION OF THE DRAWINGS

This and other aspects of the present invention will now be described in more detail, with reference to the appended drawings.

DETAILED DESCRIPTION OF PREFERRED EMBODIMENTS OF THE INVENTION

Figure 2:
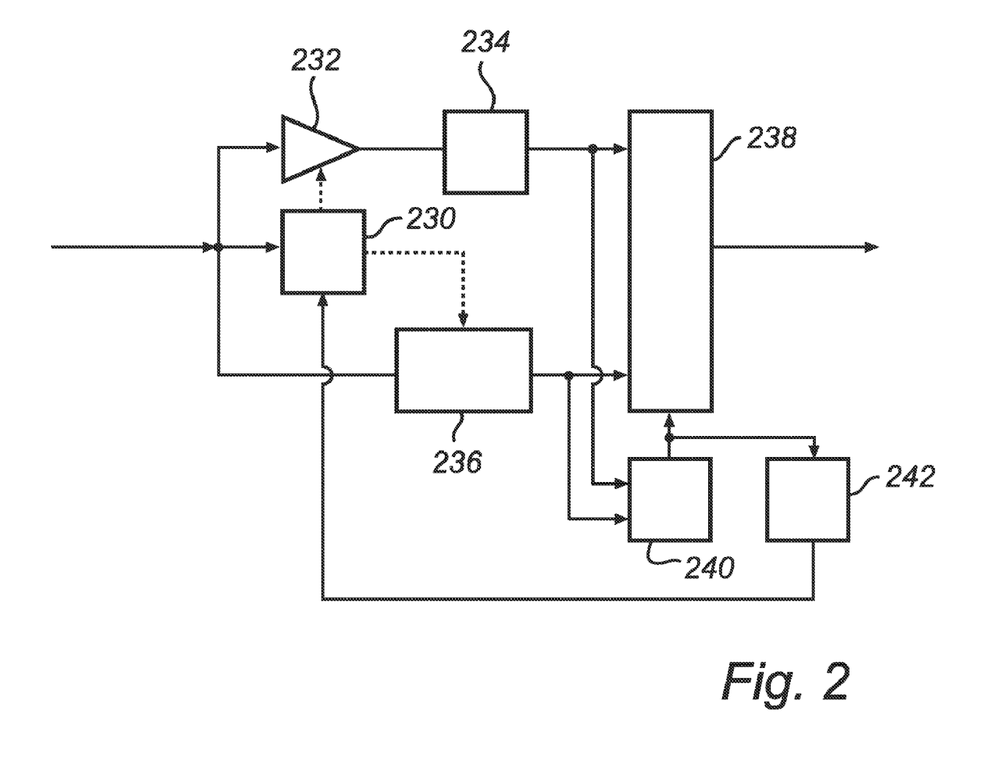
FIG. 2 shows a schematic block diagram of a system implementing a method according to an embodiment.

FIG. 2 shows a schematic block diagram of a system implementing a method according to an embodiment of the invention. The system comprises a video level analyzing block 230, a hardclipping path 232, 234, a softclipping path 236, and a selector stage 238, 240, 242. The hardclipping path here includes a video gain block 232 and a hardclipping block 234, while the softclipping path here only includes a softclipping block 236. The selector stage here includes a multiplexer (MUX) 238 and a comparator 240.

Input to the system is an image, wherein the pixels of the image are represented by video levels within a range of displayable levels (a displayable range), and the output are the image pixels represented by transformed levels within the same displayable range. In this example, the video levels are represented by 8-bits RGB-values, i.e. the displayable range of video levels are in the range of values 0-255.

The input is fed to the video gain block 232, the video level analyzing block 230 and the softclipping block 236.

The video level analyzing block 230 determines the gain factor of the video gain block 232 based on the video level content of the image. The gain factor is set to a value between 1 and 4, where high values are selected for images with a large amount of low pixel values (dark colors).

The video gain block 232, multiplies the gain factor with the video level value of each image pixel, i.e. a gain function is implemented. Mathematically the gain function may be expressed by $$g\_OUT = g*IN + g\_offset, \qquad (Eq. 1)$$

where g is the gain factor, and, in this case, $1 < g < 4$ and $g\_offset = 0$. The gain function "expands" the video levels, or, in case the video levels are presented in a histogram, the function "stretches" the histogram.

The parameters of the gain function are selected such that the minimum input value within the displayable range, is equal to an output value within the displayable range, typically the minimum input value, as is the case in this example since $s\_OUT(0)=0$.

The hardclipping block 234 sets the video levels that after the multiplication with the gain factor, exceed the displayable range, i.e. in this case 255, to the maximum value (255). Although, as will be seen below, hardclipped levels are avoided in a resulting image, the hardclipping block typically is used to avoid roll-over of the gain and/or to, in hardware, save bits for a bus or table. Also, by using a hardclipping block, the hardclipping path may be more similar to conventional hardclipping implementations, which may facilitate reuse of any already existing design.

In an alternative embodiment, a similar transform as produced by the video gain block 232 and the hardclipping block 234, instead is produced by using a look-up-table.

The softclipping block 236 preferably includes a look-up table (LUT) containing predefined values, which corresponds to a predetermined number of predefined, static softclip functions. In the case of 8-bit values, the softclipping block 236 may be implemented by a 8*8 LUT.

Contrary to the gain function, a softclip function "compresses" the video levels. Mathematically, a softclip function may be described by $$s\_OUT = s*IN + s\_offset, \qquad (Eq. 2)$$

where s is a compression factor, and $0 < s < 1$. A low compression factor means harder compression. The parameters of the softclip functions are selected such that the maximum input value within the displayable range is equal to an output value within the same displayable range, typically the maximum input value, as in this example where $s\_OUT(255)=255$. As a result, the maximum value (255) cannot be exceeded, but hardclipping can still be avoided. Instead of compressing all values to a single value (e.g. 255), as in hardclipping, the values are instead compressed into a range of values.

Which one of the static softclip functions that is the most suitable to use, depends on the gain factor and/or the video level content, which is indicated in FIG. 2 by a dotted arrow from the output of the analyzing block 230 to the softclipping block 236. Typically, a softclip function with a high compression factor (s), i.e. light compression, is selected for high gain factors (g), and a softclip function with a low compression factor (s), i.e. hard compression, is selected for low gain factors (g).

In another embodiment, only a single predetermined static softclip function is used, and in that case the softclip path requires no information from video level analyzing.

In yet another embodiment, output values for the softclip function are calculated in real time and parameters used by the softclip function may be determined in runtime based on the gain factor, or on an analyze of video level content of the image.

The two parallel paths (hardclipping and softclipping), result in two different transformed video level representations, i.e. pixel values, for each pixel of the image.

The outputs of the hardclipping path and the output of the softclipping path are fed to two separate inputs of the multiplexer 238 in the selector stage. For each value on the multiplexer 238 inputs, i.e. for each pair of transformed pixel values corresponding to a single input pixel value, there is a comparison made by the comparator 240, and the lowest multiplexer 238 input value is forwarded to the output of the multiplexer 238. This way only one transformed value for each image pixel is created at the multiplexer 238 output, even though transformed values are created in two parallel paths using two separate transfer functions. The resulting output values are a combination of input values that have been transformed by the two separate transfer functions, although it is only required to alter a single parameter (the gain factor) in order to define a desired output.

Still referring to FIG. 2, a feedback path is here provided to the analyzing block 230. The feedback path comprises a counter 242, which counts the number of values selected from the hardclipping path input of the multiplexer 238, i.e. it provides a measure of the amount of pixels in the image that are not softclipped, which indirectly also is a measure of the amount of dark pixels in the image. This number is provided to the analyzing block and compared to a softclip threshold number. Based on the comparison, it is determined whether the amount of pixels that is actually being softclipped, is acceptable or not. If the amount is acceptable, the gain factor may be increased, and/or the softclip function being used may have its slope increased until the softclip threshold number is reached. This allows for a simplified video level analyzing block 230 and an auto-adjustable transform of input levels.

For example, the feedback path may be used in connection with a LCD and dynamic backlighting, in order to automatically adjust the backlight dimming and the gain that is compensating for the dimming. Small amount of softclipped pixels means that the gain and the dimming may increase until the softclip threshold is reached.

The system of FIG. 2 may be implemented in hardware and/or software. In case of a software implementation, the software may be located in a display driver or a timing controller block (TCON).

Figure 3:
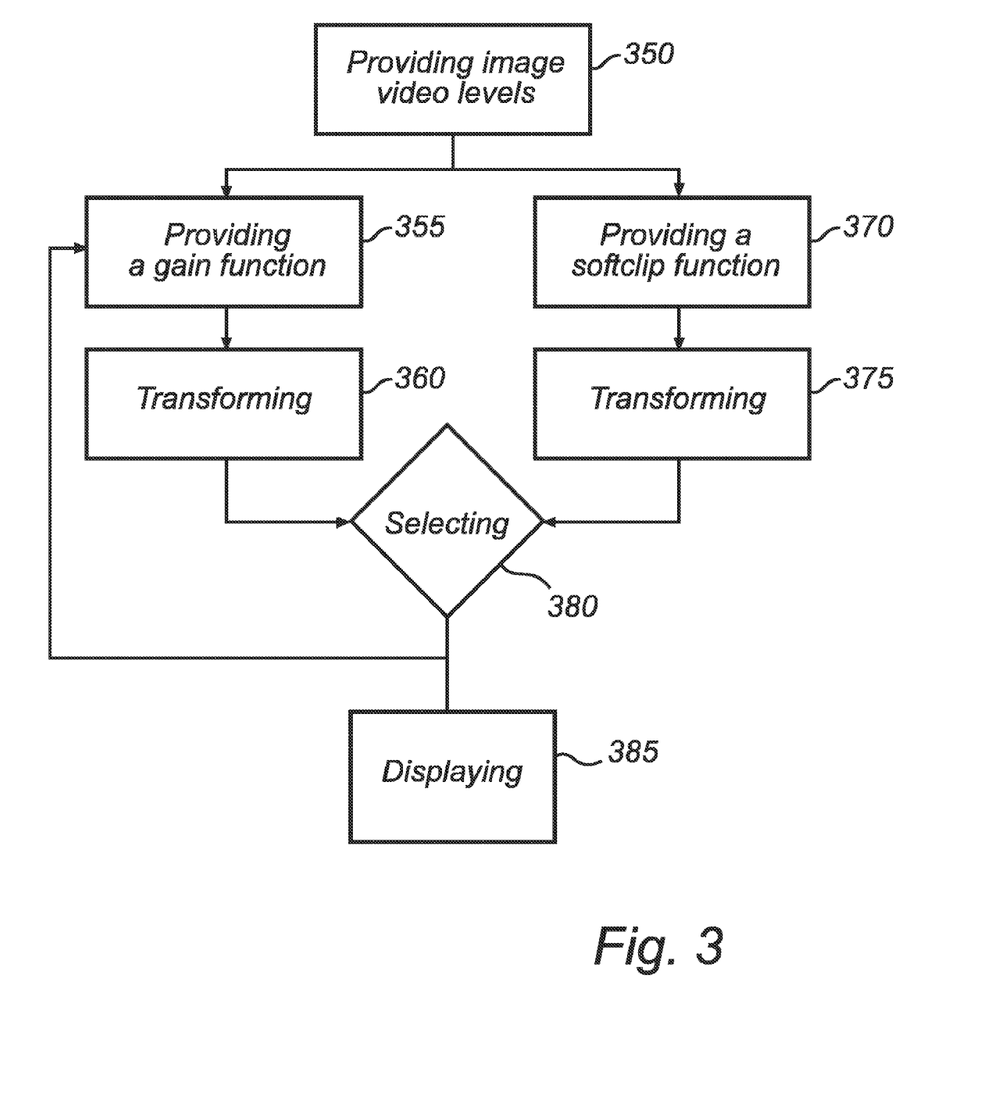
FIG. 3 is a flow chart illustrating a method according to an embodiment, FIG. 4 gives an example of transfer functions that are used in an embodiment.

FIG. 3 is a flow chart illustrating a method according to an embodiment. In a first step 350, image input video levels within a displayable range are provided, for example, when each pixel in the image is represented by 8-bit RGB-values, the displayable range of video levels are in the range 0-255. The input values are then split into parallel paths, corresponding to the hardclipping path and the softclipping path mentioned in connection with FIG. 2.

In the hardclipping path, a gain function is provided in a step 355. In the system in FIG. 2, this step is performed by the analyzing block 230. The provided gain function may be described by Eq. 1.

The provided gain function is used in a subsequent step 360, where the input video levels are transformed. In the system in FIG. 2, this step is performed by the gain block 230 and the hardclipping block 232.

In the softclipping path, a softclip function is provided in a step 370. In this step, softclip functions are predefined and stored in a look-up table and one softclip function to use with the input levels is selected. In the system in FIG. 2, this step is performed by the analyzing block 230 in connection with the predefined softclip functions that are stored in the softclip look-up table 236. The provided softclip function may be described by Eq. 2.

The predefining of softclip functions and storing of these in the look-up table, of course may be performed prior to step 350, although this is not indicated in FIG. 3. In case of a single static softclip function, the step 370 will only involve predefining one softclip function, and in such case said step may be independent from step 350.

The selected softclip function is used in a subsequent step 375, where the input video levels are transformed. In the system in FIG. 2, this step is performed by the softclipping block 236.

In step 380, for each input value, the lowest value resulting from the softclip function and the gain function is selected. In the system in FIG. 2, this step is performed by the multiplexer 238 and the comparator 240.

The result of step 380 may influence the determination of the gain function in step 355 and/or the softclip function in step 370. In the system in FIG. 2, this feedback is performed by the counter 242 and by the analyzing block 230. As mentioned in connection with FIG. 2, in one embodiment only one of the functions may be adjusted by the feedback, and in an alternative embodiment there is no feedback at all.

The transformed image, i.e. corresponding to the transformed levels that were selected in step 380, is in a subsequent step 285, shown on a display.

It should be noted that the output values, although they have been transformed, will be within the displayable range of the input signals.

To enhance understanding of the examples given above, the transfer functions now will be discussed in some detail with reference to figures.

Figure 4:
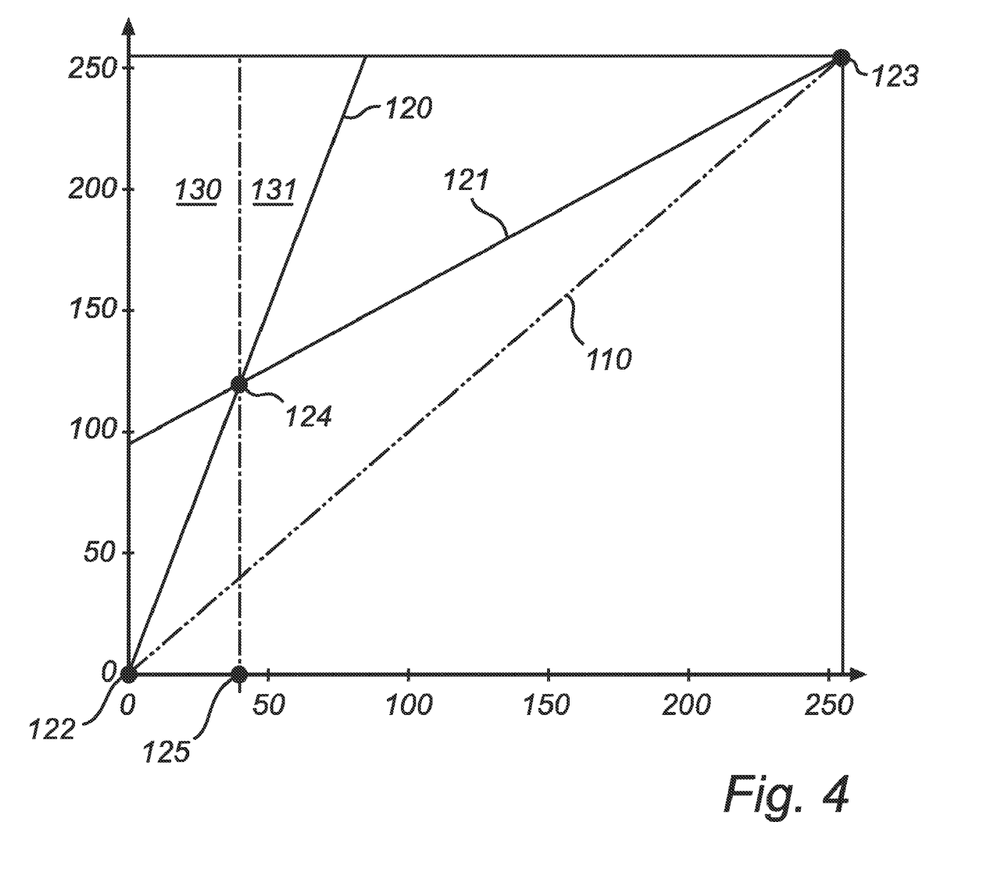

FIG. 4 gives an example of transfer functions 120, 121 that are used in an embodiment. The transfer functions 120, 121 in this example may be described by equations Eq. 1 and Eq. 2, as presented above in connection with FIG. 2.

The horizontal axis of FIG. 4 represents input video levels in a displayable range 0-255 (8-bit digital values of, for example, any of the components in a RGB-scheme), and the vertical axis represent output video levels within the same displayable range.

A gain transfer function 120, intersects the point of the lowest input/output values 122, here the origin of coordinates (coordinate 0,0 in FIG. 4) and has a slope greater than one (>1). It can be noted that the g_offset parameter of Eq. 1 is used to adapt the softclip transfer function 121 to intersect the point of the lowest input/output value, however, in this example, g_offset is zero.

The gain transfer function 122 further intersects a "softclip" transfer function 121 at an intersection point 124, which corresponds to an input threshold level 125.

The softclip transfer function 121 intersects the point of the highest input/output values 123 (coordinate 255,255 in FIG. 2) and has a slope greater than zero (>0), but less than one (<1). It can be noted that the s_offset parameter of Eq. 1 is used to adapt the softclip transfer function 121 to intersect the point of the highest input/output value.

As a consequence, in the displayable range, independent of the exact slopes of each transfer function, the output values from each function will always be greater than the input values, except at the points 122 and 123, i.e. the point of intersection 124 will be located above the "unity gain" line 110.

However, as previously mentioned, typically, a softclip function 121 with a high compression factor (s), i.e. approaching unity gain 110, is selected for high gain factors (g), i.e. for "steep" gain lines 120 with slopes approaching 4. Vice versa, a softclip function with a low compression factor (s), i.e. hard compression that approaches hardclipping, is selected for low gain factors (g), i.e. for gain lines 120 with slopes approaching the unity gain line 110.

In case of an embodiment where parameters of the gain transfer function 120 and/or the softclip transfer function 121 are adjusted based on an analysis of video levels in the image, it should be noted that this results in moving the point of intersection 124 of the transfer functions 120, 121 within certain limits, as well. Thus, the threshold level itself can be dependent on the input video levels to a certain extent.

For example, referring to FIG. 4, Eq. 1 and Eq. 2, adjustment of the transfer function slopes would involve placing the point of intersection 124 somewhere within the area restricted by the "unity gain" line (x,y), a "maximum gain" line (4x, y) and a "hardclip" line (x, 255), but preferably, as mentioned above, closer to the unity gain line (x,y) than to any of the other two. The maximum gain line and the hardclip line are determined by the restrictions set on the gain factor (g) and the compression factor (s) in equations Eq. 1 and Eq. 2 respectively.

By selecting output values from the gain transfer function 120 in the gain region 130, and output values from the softclip transfer function 121 in the softclip region 131, output values will be within the range of the input values (0-255), i.e. within the displayable range, independent of the input value. This corresponds to selecting, for each input value within the displayable range, the lowest value from the two functions.

From FIG. 4 and from the mathematical expressions of the gain function and the softclip function, Eq. 1 and Eq. 2, it is implied that the two functions will intersect each other within the displayable range. For input values above the point of intersection, the softclip function will provide the lowest values, and for values below the point of intersection, the gain function will provide the lowest values.

It will be appreciated that during use, the resulting transfer function from the two individual functions, will exhibit a dynamic behavior even though one of the functions is static. For example, one static softclip function 121 may be used together with a dynamic gain function 120 having a gain factor (the slope of the gain function) that changes depending on the video levels of an image. Changing the gain (the slope), means that the point of intersection 124 changes, and thus the threshold level 125, and as a consequence, both the gain region 130 and the softclip region 131 changes. Hence, although only one function is dynamic and the other has a static implementation, the overall result is a dynamic transfer function.

It should be noted that when the functions 120, 121 act on separate sub-colors of a pixel, e.g. when the gain function 120 acts on R and B, and the softclip function 121 acts on G, the result may be color distortion for that pixel. However, typically any distortion is less when the point of intersection is kept not too far from the unity gain line 110. Also, to compensate for such distortions, a commonly known "false color"-algorithm may be used, which basically means that the relation between sub-colors always is kept constant. When such an algorithm affects a pixel, the hue will be correct but to the price of less luminance and color saturation for that pixel.

Figure 5A:
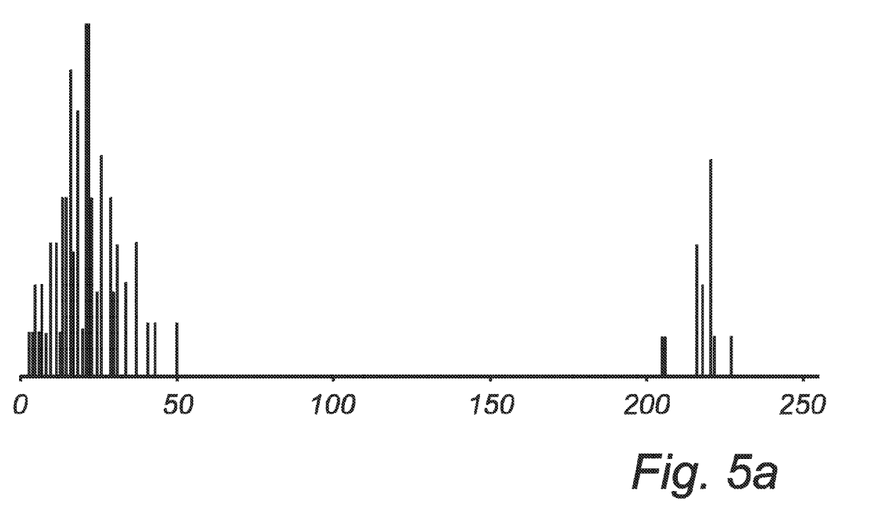
FIG. 5a illustrates a histogram, representing a distribution of video levels (0-255) for pixels in an image.

FIG. 5*a* illustrates a histogram, representing an example of a distribution of input video levels (0-255) for pixels in an image. As can be seen, this particular image has a relatively large amount of low value pixels (dark regions) but also a small amount of relatively high value pixels (light regions, or details, in the image).

Figure 5B:
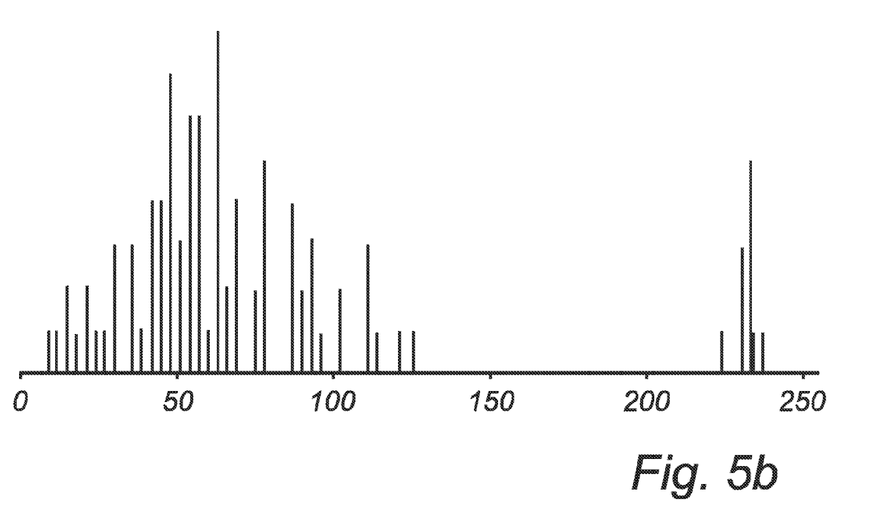
FIG. 5b shows a histogram after the transfer functions of FIG. 4 have been applied to the levels from the histogram in FIG. 5a according to an embodiment.

FIG. 5*b*, shows a histogram after the transfer functions of FIG. 4 have been used on the levels from the histogram in FIG. 5*a* according to an embodiment. As can be seen in FIG. 5*b*, the histogram of FIG. 5*a* has been stretched and moved towards higher (lighter) values for levels in the gain region 130 of FIG. 4, i.e. in this region there is an increase of perceived contrast, and pixels have become "lighter". For levels in the softclip region 131 of FIG. 4, the histogram of FIG. 5*a* instead has been "compressed" and moved towards higher (lighter) values, which also can be seen in FIG. 5*b*. The compression results in reduced contrast, but contrary to the prior art approach of hardclipping, there is still a spread amongst the video levels, and thus local contrast in the higher levels is not completely lost.

The person skilled in the art realizes that the present invention by no means is limited to the preferred embodiments described above. On the contrary, many modifications and variations are possible within the scope of the appended claims. For example, the transfer functions showed have been linear, however, as the skilled person realizes, also non-linear functions with slopes according to the claims, may be used. For example, two functions with decreasing slopes, or one function with a decreasing slope that is equal to one at the threshold value. Also, in the examples, the provided gain function has been for low levels and the provided softclip function for high levels. However, in order to increase contrast at high levels and to prevent hardclipping at low levels, a gain function 120 might be provided for high levels and a softclip function 121 for low levels.

The invention claimed is:

1. Method for improvement of contrast in an image shown on a display, said display having a range of displayable video levels, comprising the steps of:
   providing, to a video level analyzing circuit block, input video levels representing the image, said levels being within said displayable range;
   providing a transfer function having a slope that is greater than one substantially throughout a gain region of said displayable range, and that is greater than zero and less than one substantially throughout a softclip region of said displayable range, said regions meeting at a threshold level, the transfer function being configured and arranged to transfer an input video level within said displayable range to an output level within displayable said range; and
   transforming said input levels, using an adjustable gain circuit block, into output levels within said range, using the transfer function.

2. The method as claimed in claim 1, wherein the transfer function is defined by a linear gain function in the gain region, and by a linear softclip function in the softclip region, each of the two functions being defined in both regions, and wherein an intersection of said linear functions defines the threshold level.

3. The method as claimed in claim 1, further comprising adjusting the slope of the gain transfer function based on the input video levels.

4. The method as claimed in claim 1, further comprising adjusting the slope of the gain transfer function based on the output video levels.

5. The method as claimed in claim 1, further comprising adjusting the slope of the softclip transfer function based on the input video levels.

6. The method as claimed in claim 1, further comprising adjusting the slope of the softclip transfer function based on the output video levels.

7. The method as claimed in claim 1, wherein the step of transforming the input video levels involves determining output video levels from both transfer functions in both regions.

8. The method as claimed in claim 7, wherein the output video levels are formed by selecting, for each input video level, the lowest of the output video levels from both transfer functions.

9. A signal processing device for processing input video levels, said input levels being in a range of video levels displayable on a display, said device comprising:
   a data circuit configured and arranged for providing a transfer function having a slope greater than one everywhere in a gain region of said displayable range, and a slope greater than zero and less than one everywhere in a softclip region of said displayable range, said regions meeting at a threshold level, the transfer function being configured and arranged to transfer any input video level within said displayable range to an output level within displayable said range;
   and an adjustable-gain circuit configured and arranged for transforming said input levels into output levels within said range, using the transfer function.

10. The device as claimed in claim 9, wherein the transfer function is defined by a linear gain function in the gain region, and by a linear softclip function in the softclip region, each of the two functions being defined in both regions, wherein an intersection of said linear functions defines the threshold level.

11. The device as claimed in claim 9, further comprising means for adjusting the slope of the gain transfer function and/or the slope of the softclip transfer function based on the output video levels.

12. The device as claimed in claim 9, wherein the adjustable-gain circuit comprises means for transforming the input video levels using the gain function in both regions and means for transforming the input video levels using the softclip function in both regions.

13. The device as claimed in claim 12, further comprising means arranged to compare a level transformed using the gain function and a level transformed using the softclip function, and to select the lowest or highest level as output level.

14. The device as claimed in claim 13, further comprising a counter arranged to count the number of times a level transformed using a particular function is selected as output level.

15. A display device comprising a signal processing device according to claim 9.

16. A signal processing device for processing input video levels, said input levels being in a range of video levels displayable on a display, said device comprising:
- means for providing a transfer function having a slope greater than one everywhere in a gain region of said displayable range, and a slope greater than zero and less than one everywhere in a softclip region of said displayable range, said regions meeting at a threshold level, the transfer function being configured and arranged to transfer any input video level within said displayable range to an output level within displayable said range; and
- means for transforming said input levels into output levels within said range, using the transfer function.

17. The device of claim 16, wherein the means for transforming comprises means for transforming the input video levels using the gain function in both regions and means for transforming the input video levels using the softclip function in both regions.

* * * * *